(12) United States Patent
Glen (10) Patent No.: US 8,615,156 B2
(45) Date of Patent: Dec. 24, 2013

(54) ADJUSTING VIDEO PROCESSING IN A SYSTEM HAVING A VIDEO SOURCE DEVICE AND A VIDEO SINK DEVICE

(75) Inventor: David Glen, Toronto (CA)

(73) Assignee: ATI Technologies ULC, Markham, Ontario (CA)

(*) Notice: Subject to any disclaimer, the term of this patent is extended or adjusted under 35 U.S.C. 154(b) by 589 days.

(21) Appl. No.: 12/339,563

(22) Filed: Dec. 19, 2008

(65) Prior Publication Data
US 2009/0162029 A1 Jun. 25, 2009

Related U.S. Application Data

(60) Provisional application No. 61/015,322, filed on Dec. 20, 2007.

(51) Int. Cl.
| H04N 5/775 | (2006.01) |
| H04N 5/765 | (2006.01) |
| H04N 9/80 | (2006.01) |
| H04N 5/93 | (2006.01) |
| G11B 27/00 | (2006.01) |

(52) U.S. Cl.
USPC ........... 386/230; 386/200; 386/239; 386/248; 386/278

(58) Field of Classification Search
USPC .................. 345/643; 386/200–234, 239–248, 386/278–290
See application file for complete search history.

(56) References Cited

U.S. PATENT DOCUMENTS

| 4,792,974 A | 12/1988 | Chance |
| 5,852,472 A | 12/1998 | Prasad et al. |
| 5,960,081 A | 9/1999 | Vynne et al. |
| 6,314,479 B1 | 11/2001 | Frederick et al. |
| 6,463,445 B1 | 10/2002 | Suzuki et al. |

(Continued)

FOREIGN PATENT DOCUMENTS

| CN | 1815606 | 8/2006 |
| EP | 1328125 | 7/2003 |

(Continued)

OTHER PUBLICATIONS

International Search Report from Canadian Patent Office; for International Application No. PCT/CA2008/002187; dated Apr. 15, 2009.

(Continued)

Primary Examiner — Hung Dang
(74) Attorney, Agent, or Firm — Faegre Baker Daniels LLP (57) ABSTRACT

One of a video source device and a video sink device may: (a) deactivate a video processing function at the one device and send a command for causing the other of the video source device and the video sink device to activate the video processing function; (b) activate the video processing function at the one device and send a command for causing the other device to deactivate the video processing function; and (c) based on user input indicating whether (a) or (b) resulted in a preferred video image, effect (a) or (b). The one device may receive an indication of video processing functions of which the other device is capable, such that (a), (b) and (c) may be performed for each indicated video processing function of which the one device is also capable. A user interface including at least one selectable control for indicating whether a video image resulting from (a) or (b) is preferred may be displayed.

26 Claims, 8 Drawing Sheets

(56) References Cited

U.S. PATENT DOCUMENTS

| | | | |
|---|---|---|---|
| 6,484,128 B1 | 11/2002 | Sekiya | |
| 6,609,251 B1 | 8/2003 | Yoneda | |
| 7,079,128 B2 | 7/2006 | Kim | |
| 7,216,177 B1 | 5/2007 | Strong et al. | |
| 7,256,835 B2 | 8/2007 | Jiang et al. | |
| 7,349,029 B1 | 3/2008 | Chou | |
| 7,355,531 B2 | 4/2008 | Lai et al. | |
| 7,382,364 B2 | 6/2008 | Sasaki | |
| 7,542,618 B2 | 6/2009 | Kang et al. | |
| 7,548,675 B2 | 6/2009 | Tatum et al. | |
| 7,734,143 B2 * | 6/2010 | Mizuhashi et al. | 386/241 |
| 7,929,525 B2 | 4/2011 | Winter et al. | |
| 7,954,131 B2 | 5/2011 | Cholas et al. | |
| 8,117,620 B2 | 2/2012 | Raghunath et al. | |
| 2001/0019365 A1 | 9/2001 | Kim et al. | |
| 2002/0156870 A1 | 10/2002 | Boroumand et al. | |
| 2002/0161844 A1 | 10/2002 | Overtoom | |
| 2003/0191623 A1 | 10/2003 | Salmonsen | |
| 2004/0085283 A1 | 5/2004 | Wang | |
| 2004/0194132 A1 | 9/2004 | Kawashima et al. | |
| 2004/0218599 A1 | 11/2004 | Kobayashi | |
| 2005/0259751 A1 | 11/2005 | Howard et al. | |
| 2005/0270415 A1 | 12/2005 | Jiang et al. | |
| 2006/0056629 A1 | 3/2006 | Adamson et al. | |
| 2006/0066504 A1 | 3/2006 | Sampsell et al. | |
| 2006/0067690 A1 | 3/2006 | Tatum et al. | |
| 2006/0077778 A1 | 4/2006 | Tatum et al. | |
| 2006/0140499 A1 | 6/2006 | Kang et al. | |
| 2006/0182422 A1 | 8/2006 | Peng | |
| 2006/0184992 A1 | 8/2006 | Kortum et al. | |
| 2006/0269056 A1 | 11/2006 | Montag | |
| 2007/0058077 A1 | 3/2007 | Hirai | |
| 2007/0186015 A1 | 8/2007 | Taft et al. | |
| 2007/0230578 A1 | 10/2007 | Shi et al. | |
| 2007/0268164 A1 | 11/2007 | Lai et al. | |
| 2007/0286246 A1 | 12/2007 | Kobayashi | |
| 2008/0072261 A1 | 3/2008 | Ralston et al. | |
| 2008/0201748 A1 | 8/2008 | Hasek et al. | |
| 2009/0031381 A1 | 1/2009 | Cohen et al. | |
| 2009/0046205 A1 | 2/2009 | Strasser et al. | |
| 2009/0046993 A1 | 2/2009 | Nishio | |
| 2010/0142723 A1 | 6/2010 | Bucklen | |
| 2010/0296558 A1 | 11/2010 | Matsushita et al. | |
| 2011/0026779 A1 * | 2/2011 | Matsumoto et al. | 382/118 |

FOREIGN PATENT DOCUMENTS

| | | |
|---|---|---|
| EP | 1675382 A2 | 6/2006 |
| EP | 1677249 A2 | 7/2006 |
| EP | 1995952 | 11/2008 |
| JP | 2004-126749 | 4/2004 |
| JP | 2006-222958 | 8/2006 |
| JP | 2006-352186 | 12/2006 |
| JP | 2007-043659 | 2/2007 |
| WO | 03073229 | 9/2003 |
| WO | 2007026126 | 3/2007 |
| WO | 2007/102413 A1 | 9/2007 |

OTHER PUBLICATIONS

Debooer, Clint; Video Processing in DVD Players, Receivers and Displays; Audioholics Online A/V Magazine; Dated Mar. 25, 2007; from www.audioholics.com.

Japanese Office Action; Japanese Application No. 2010-538296; dated Sep. 5, 2012.

EP Extended Search Report; EP Application No. 08865646.7; dated Sep. 24, 2012.

"HD HQV Benchmark Testing & Scoring Guide"; from http://gizmodo.com; Jun. 6, 2007.

Chinese Office Action; Chinese Patent Application No. 200880127097.5; dated Feb. 4, 2013.

Japanese Office Action; Japanese Patent Application No. 2010-538290; dated Jan. 9, 2013.

EP Office Action; EP Application No. 08865646.7; dated May 21, 2013.

Silva, Robert; Upscaling DVD Players vs Upscaling HDTVs; About.com Guide; May 15, 2007.

International Search Report and Written Opinion mailed Nov. 15, 2011, in PCT Patent Application No. PCT/CA2011/00932.

"802.3" posted Dec. 27, 200 on Whatis.com.

"Universal Plug and Play," posted Jan. 27, 2006, on Whatis.com.

Ritchie et al., UPnP AV Architecture:1, Jun. 25, 2002, pp. 1-22, vol. 1.

International Search Report and Written Opinion mailed Feb. 4, 2010, in PCT Patent Application No. PCT/US2009/059162.

Bui, Kieu Oah T, USPTO Communication dated Oct. 14, 2011, in U.S. Appl. No. 11/957,852, filed Dec. 17, 2007.

Bui, Kieu Oah T, USPTO Communication dated Mar. 13, 2012, in U.S. Appl. No. 11/957,852, filed Dec. 17, 2007.

Bui, Kieu Oah T, USPTO Communication dated Sep. 24, 2012, in U.S. Appl. No. 11/957,852, filed Dec. 17, 2007.

Chinese Office Action dated May 31, 2012, in Chinese Application No. 200880126956.9.

Chinese Office Action dated Sep. 18, 2012, in Chinese Application No. 200880126817.6.

Christensen, Scott B., USPTO Communication dated Oct. 25, 2011 in U.S. Appl. No. 12/245,216, filed Oct. 3, 2008.

Chinese Office Action dated Mar. 8, 2013, in Chinese Application No. 200880126956.9.

Baig, Sahar A., USPTO Communication dated Mar. 18, 2013, in U.S. Appl. No. 12/860,549, filed Aug. 20, 2010.

Baig, Sahar A., USPTO Communication dated Jul. 11, 2012, in U.S. Appl. No. 12/860,549, filed Aug. 20, 2010.

Content Descriptor Definitions; TXH Blackbird; Mar. 9, 2005; pp. 1-46.

Christensen, Scott B., USPTO Communication dated Apr. 28, 2011 in U.S. Appl. No. 12/245,216, filed Oct. 3, 2008.

EPC Communication pursuant to Article 94(3) dated Dec. 20, 2012, in EP Application No. 08861200.7.

European Extended Search Report dated May 24, 2012, in European Application No. 08861200.7.

Rahman, Mustafizur, USPTO Communication dated Sep. 30, 2011, in U.S. Appl. No. 12/338,386, filed Dec. 18, 2008.

European Extended Search Report dated Jul. 17, 2012, in European Application No. 08862385.5.

HDMI Consortium, "High-Definition Multimedia Interface. Spec 1.1", Version 1.1; May 20, 2004.

HDMI Licensing LLC, "High-definition multimedia interface specification," version 1.3a, Nov. 10, 2006, HDMI Licensing LLC, pp. 118-126.

HDMI Transport Specification; TXH Blackbird; Mar. 9, 2006; pp. 1-31.

Rahman, Mustafizur, USPTO Communication dated Mar. 2, 2012, in U.S. Appl. No. 12/338,386, filed Dec. 18, 2008.

International Search Report and Written Opinion mailed Mar. 23, 2009, in PCT Patent Application No. PCT/CA2008/002214.

International Search Report and Written Opinion mailed Apr. 8, 2009, in PCT Patent Application No. PCT/CA2008/002217.

Silva, Robert. "Upscaling DVD Players vs. Upscaling HDTVs," http://hometheather.about.com/od/dvdbasics/qt/dvdhdtvscaling.htm, retrieved: Dec. 21, 2012.

Rahman, Mustafizur, USPTO Communication dated Aug. 2, 2013, in U.S. Appl. No. 12/338,386, filed Dec. 18, 2008.

Le, Rong, USPTO Communication dated Sep. 27, 2011, in U.S. Appl. No. 11/957,938, filed Dec. 17, 2007.

Le, Rong, USPTO Communication dated Mar. 28, 2012, in U.S. Appl. No. 11/957,938, filed Dec. 17, 2007.

Le, Rong, USPTO Communication dated Sep. 24, 2012, in U.S. Appl. No. 11/957,938, filed Dec. 17, 2007.

Le, Rong, USPTO Communication dated Jun. 6, 2013, in U.S. Appl. No. 11/957,938, filed Dec. 17, 2007.

Nghiem et al., "A new evaluation approach for video processing algorithms", IEEE Workshop on Motion and Video Computing (WMVC'07), Feb. 28, 2007.

* cited by examiner

| Video Processing Function 72 | Available 74 |
|---|---|
| Scan-rate conversion | Yes |
| Interlacing | Yes |
| De-interlacing | Yes |
| De-noise | No |
| Scaling | Yes |
| Color correction | No |
| Contrast correction | No |
| Gamma correction | No |
| Detail enhancement | No |

FIG. 5

| Video Processing Function 82 | Available 84 |
|---|---|
| Scan-rate conversion | Yes |
| Interlacing | No |
| De-interlacing | Yes |
| De-noise | Yes |
| Scaling | Yes |
| Color correction | Yes |
| Contrast correction | Yes |
| Gamma correction | Yes |
| Detail enhancement | Yes |

ADJUSTING VIDEO PROCESSING IN A SYSTEM HAVING A VIDEO SOURCE DEVICE AND A VIDEO SINK DEVICE

CROSS REFERENCE TO RELATED APPLICATIONS

This application claims the benefit of U.S. Provisional Application No. 61/015,322 filed on Dec. 20, 2007, the contents of which are hereby incorporated by reference hereinto.

FIELD OF TECHNOLOGY

The present disclosure relates video processing, and more particularly to adjusting video processing in a system having a video source device and a video sink device.

BACKGROUND

It is not uncommon for video source devices (i.e. devices capable of outputting a video signal comprising a video image, such as DVD-Video players, High-Density HD-DVD Video players, Blu-Ray disc players, set-top boxes, or PCs) and video sink devices (i.e. devices capable of receiving a video signal and applying further video processing to the signal, and possibly displaying the resulting video images, such as televisions or monitors, which may be analog or digital devices such as Cathode Ray Tubes (CRTs), flat panel displays such as Liquid Crystal Displays (LCDs) or plasma displays, or rear-projection displays such as Digital Light Processing (DLP) or Liquid Crystal on Silicon (LCoS) displays for example) to be purchased separately. For example, a consumer assembling a home entertainment system may purchase the video source device component from one manufacturer and the video sink device component from another manufacturer. The consumer's choice of components may be motivated by such factors as consumer preference, availability, or retailer promotions. The consumer may then interconnect the components within the home entertainment system so that the source device outputs a video signal to the sink device. The interconnection may be by way a cable and may conform to a known industry standard, such as VGA, composite/S-video or component out, Digital Visual Interface (DVI), High-Definition Multimedia Interface™ (HDMI™) or DisplayPort®, for example, or may be a wireless display interface (e.g. "wireless HDMI").

Many contemporary video source devices are capable of performing various video processing functions such as frame-rate conversion, interlacing, de-interlacing, de-noise, scaling, color correction, contrast correction, gamma correction and detail enhancement for example. Each video processing function may be performed by a functional block of a video processor, which may be effected in hardware, software, firmware or combinations of these. A functional block may be implemented in different ways in different video source devices. That is, a functional block in one video source device may apply one video processing algorithm to achieve the desired video processing function while the same functional block in another video source device applies another video processing algorithm to achieve that video processing function, in a different way. For example, some interlacer blocks may apply a scan line decimation algorithm to interlace video while others apply a vertical filtering algorithm. The algorithm that is used by a functional block may be fixed or dynamically configurable. In the latter case, the algorithm that is used at any given time may depend upon such factors as the content of the video signal presently being processed or user preferences for example.

A video sink device may also be capable of applying various video processing functions to a received video signal, including some or all of the same video processing functions that the upstream video source device is capable of performing (referred to as "overlapping video processing functions"). The overlap may be by virtue of the fact that the video sink device is a modular component that is intended to be capable of interconnection with various types of video source devices whose video processing capabilities may vary. The video source device and video sink device may therefore each have different strengths and weaknesses from a video processing standpoint. For example, the source device may be capable of numerous frame-rate conversion functions that the sink device is incapable of executing, while the sink device is capable of numerous de-interlacing functions that the source device is incapable of executing.

It is known to provide consumers with a DVD containing test video images and video clips along with instructions for playing the DVD in a player connected to a television. The instructions may suggest DVD-Video player output settings for testing the DVD-Video player (e.g. 720p, 768p, 1080i or 1080p) as well as DVD-Video player output settings for testing the television (e.g. 480i), for various television types (e.g. 720p DLP, LCD or Plasma; 768p LCD or Plasma; 1024×1024 Plasma; or 1920×1080 DLP, LCD or Plasma). The instructions may also describe how the displayed images or clips should be evaluated for quality. Disadvantageously, it is up to the user to set the DVD-Video player output settings correctly. If settings are not correctly set, the evaluated quality of the displayed images or clips may be attributed to the wrong device (DVD-Video player or television). In view of the complex user interfaces of many DVD-Video players and the inexperience of many users in configuring output settings, the likelihood of an incorrect output setting is high. Moreover, even if the DVD-Video player output settings are correctly set, it is still the responsibility of the user to ultimately configure the DVD-Video player in the proper mode for optimal image quality based on the outcome of the test. Again, the likelihood of an erroneous configuration is relatively high.

A solution which mitigates or obviates at least some the above-noted disadvantages would be desirable.

SUMMARY

In one aspect, there is provided a method comprising, at one of a video source device and a video sink device: (a) deactivating a video processing function at the one device and sending a command for causing the other of the video source device and the video sink device to activate the video processing function; (b) activating the video processing function at the one device and sending a command for causing the other device to deactivate the video processing function; and (c) based on user input indicating whether (a) or (b) resulted in a preferred video image, effecting (a) or (b).

In another aspect, there is provided a machine-readable medium storing instructions that, when executed by a processor of one of a video source device and a video sink device, cause the one device to: (a) deactivate a video processing function at the one device and send a command for causing the other of the video source device and the video sink device to activate the video processing function; (b) activate the video processing function at the one device and send a command for causing the other device to deactivate the video processing function; and (c) based on user input indicating whether (a) or (b) resulted in a preferred video image, effect (a) or (b).

In another aspect, there is provided a video sink device comprising a processor and memory interconnected with the processor, the memory storing instructions which, when executed by the processor, cause the video sink device to: (a) deactivate a video processing function at the video sink device and send a command for causing a video source device to activate the video processing function; (b) activate the video processing function at the video sink device and send a command for causing the video source device to deactivate the video processing function; and (c) based on user input indicating whether (a) or (b) resulted in a preferred video image, effect (a) or (b).

In another aspect, there is provided a video source device comprising a processor and memory interconnected with the processor, the memory storing instructions which, when executed by the processor, cause the video source device to: (a) deactivate a video processing function at the video source device and send a command for causing a video sink device to activate the video processing function; (b) activate the video processing function at the video source device and send a command for causing the video sink device to deactivate the video processing function; and (c) based on user input indicating whether (a) or (b) resulted in a preferred video image, effect (a) or (b).

In another aspect, there is provided a machine-readable medium storing instructions that, when processed, cause the creation of a circuit capable of: (a) deactivating a video processing function at one of a video source device and a video sink device and sending a command for causing the other of the video source device and the video sink device to activate the video processing function; (b) activating the video processing function at the one device and sending a command for causing the other device to deactivate the video processing function; and (c) based on user input indicating whether (a) or (b) resulted in a preferred video image, effecting (a) or (b), wherein the circuit comprises the one device.

Other aspects and features of the present disclosure will become apparent to those ordinarily skilled in the art upon review of the following description of specific embodiments of the invention in conjunction with the accompanying figures.

BRIEF DESCRIPTION OF THE DRAWINGS

In the figures which illustrate an exemplary embodiment of this invention.

DETAILED DESCRIPTION

Figure 1:
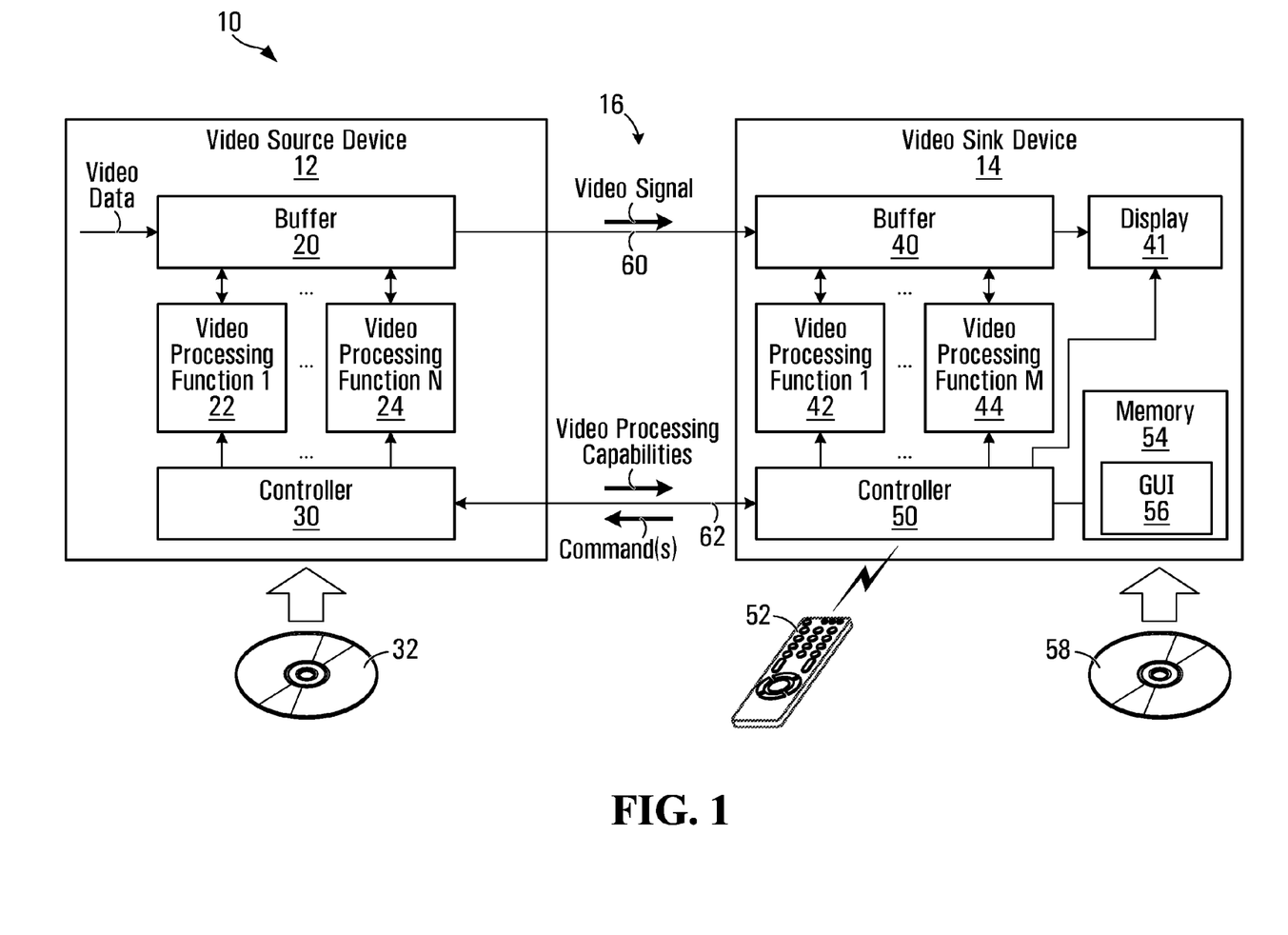
FIG. 1 is a schematic diagram of a system having a video source device and a video sink device.

Referring to FIG. 1, an exemplary system 10 is illustrated. The system 10 includes a video source device 12 and a video sink device 14 interconnected by a video interconnection 16.

The video source device 12 is an electronic device that outputs a video signal, comprising frames or fields for example, over interconnection 16. The device 12 may for example be a PC, DVD-Video player, HD-DVD Video player, Blu-Ray disc player, or set-top box receiving video signals from any of a coaxial cable, satellite dish, telephone line, broadband over power line, Ethernet cable, or analog or digital broadcast (e.g. VHF, UHF or HD) for example. As shown in FIG. 1, the video source device 12 includes a buffer 20, video processing functional blocks 22 and 24, and a controller 30. Other components of video source device 12 are omitted for clarity.

Buffer 20 stores video data, which may be in the form of frames or fields, upon which one or more of the functional blocks 22 and 24 selectively performs video processing functions. The video data that is stored may have been decoded into frames or fields by a decoder (not illustrated), which may be compliant with any one of a number of video encoding/compression standards, such as MPEG, MPEG 2, MPEG 4, divX, ITU Recommendation ITU-H.264, HDMI™, ATSC, PAL or NTSC television, digital television (e.g. ITU BT.601) or the like, upstream of the buffer within the video source device 12. The video signal upon which the decoder (if present) operates may be received by video source device 12 from an external source (e.g. cable head-end, satellite or broadcast), read by device 12 from a storage medium (e.g. a hard drive or optical disk such as a DVD), or generated by device 12 (e.g. by a software application such as a video game) for example. Buffer 20 may form part of a larger volatile memory within the video source device 12. Buffer 20 may have the capacity to store multiple contiguous frames or fields at once, in order to facilitate parallel operation of video processing functional blocks 22 and 24. Once video processing functions have been performed upon the video data, the processed video data is output from the buffer 20 over interconnection 16 as a video signal, typically (although not necessarily) by way of a video interface transmitter (not illustrated). The role of the video interface transmitter, if present, is to convert the video data into a video signal that complies with the operative video interface standard that governs interconnection 16 (e.g. the DVI, HDMI™, DisplayPort®, Digital Flat Panel (DFP) Interface, Open LVDS Display Interface (OpenLDI), or Gigabit Video Interface (GVIF) standard, or a wireless display interface). A frame buffer (not illustrated) may be interposed between the buffer and the video interface transmitter, for storing the processed video data prior to its transmission over interconnection 16.

Each of video processing functional blocks 22, 24 is hardware, software, or firmware (or a combination of these) block that performs a video processing function. Although only two blocks 22, 24 are illustrated in FIG. 1, it should be appreciated that the number of blocks may be N, where N is an integer greater than or equal to one. The video processing functions performed by the N blocks may include frame-rate conversion, interlacing, de-interlacing, de-noise, scaling, color correction, contrast correction, gamma correction and detail enhancement for example. Some functional blocks may be capable of selectively performing one of a number of algorithms to achieve the desired video processing function. For example, an interlacing block may be capable of applying either a scan line decimation algorithm or a vertical filtering algorithm. The algorithm that is used at any given time may depend upon such factors as the content of the video data presently being processed or user preferences for example. Other functional blocks may apply only one algorithm to achieve the desired video processing function (i.e. the algorithm may be fixed). For clarity, the term "algorithm" as used herein should not be understood to necessarily connote a software implementation.

For illustration, a number of exemplary video processing functions are identified below, with two or more video processing algorithms that could be performed to achieve the video processing function being briefly described for each function.

Scan-Rate Conversion (i.e. Frame-Rate Conversion)

Dropping/duplicating every N frames/fields—this is a simple form of scan-rate conversion in which one out of every N fields is dropped or duplicated. For example, the conversion of 60-Hz to 50-Hz interlaced operation may drop one out of every six fields. A possible disadvantage of this technique is apparent jerky motion referred to as "judder".

3:2 Pulldown—this technique is commonly used when converting 24 frames/second content to NTSC (59.94-Hz field rate). The film speed is slowed down by 0.1% to 23.976 (24/1.001) frames/second. Two film frames generate five video fields.

Other Pulldown—other types of pulldown, e.g. 2:2, 24:1, and others, may be performed.

Temporal Interpolation—this technique generates new frames from the original frames as needed to generate the desired frame rate. Information from both past and future input frames may be used to optimally handle appearing and disappearing objects. When converting from 50-Hz to 60-Hz using temporal interpolation, there are six fields of 60-Hz video for every five fields of 50-Hz video. After both sources are aligned, two adjacent 50-Hz fields are mixed together to generate a new 60-Hz field.

Motion Compensation—motion compensation attempts to identify true motion vectors within the video data and to use this information during temporal interpolation to minimize motion artifacts. This can result in smooth and natural motion free from judder.

Interlacing

Scan Line Decimation—in this approach, every other active scan line in each noninterlaced frame is discarded.

Vertical De-Flicker Filtering—in this approach, two or more lines of noninterlaced data are used to generate one line of interlaced data. Fast vertical transitions are smoothed out over several interlaced lines.

De-Interlacing

Scan Line Duplication—scan line duplication duplicates the previous active scan line. Although the number of active scan lines is doubled, there is no increase in the vertical resolution.

Field Merging—this technique merges two consecutive fields together to produce a frame of video. At each field time, the active scan lines of that field are merged with the active scan lines of the previous field. The result is that for each input field time, a pair of fields combine to generate a frame. Moving objects may have artifacts, also called "combing," due to the time difference between two fields.

Scan Line Interpolation—scan line interpolation generates interpolated scan lines between the original active scan lines. The number of active scan lines is doubled, but the vertical resolution is not. In a simple implementation, linear interpolation is used to generate a new scan line between two input scan lines. Better results, may be achieved by using a Finite Impulse Response (FIR) filter:

Motion Adaptive De-interlacing—in "per pixel" version of this approach, field merging is used for still areas of the picture and scan line interpolation is used for areas of movement. To accomplish this, motion, on a sample-by-sample basis, is detected over the entire picture in real time. Several fields of video at thus processed at once. As two fields are combined, full vertical resolution is maintained in still areas of the picture. A choice is made as to when to use a sample from the previous field (which may be in the "wrong" location due to motion) or to interpolate a new sample from adjacent scan lines in the current field. Crossfading or "soft switching" is used to reduce the visibility of sudden switching between methods. Some solutions may perform "per field" motion adaptive de-interlacing to avoid the need to make decisions for every sample, as is done in "per pixel" motion adaptive de-interlacing.

Motion Compensated De-interlacing—motion compensated (or "motion vector steered") de-interlacing, which is several orders of magnitude more complex than motion adaptive de-interlacing, requires calculating motion vectors between fields for each sample and interpolating along each sample's motion trajectory. Motion vectors are also found that pass through each of any missing samples.

Diagonal Edge Interpolation—searches for diagonal lines and attempts to interpolate along those lines in order to remove apparent "staircase" effects.

Scaling

Pixel Dropping and Duplication—in this approach, which may be referred to as "nearest neighbor" scaling, only the input sample closest to the output sample is used. In pixel dropping, X out of every Y samples are thrown away both horizontally and vertically. A modified version of the Bresenham line-drawing algorithm is typically used to determine which samples not to discard. In pixel duplication, which can accomplish simple upscaling, X out of every Y samples are duplicated both horizontally and vertically.

Linear Interpolation—in this approach, when an output sample falls between two input samples (horizontally or vertically), the output sample is computed by linearly interpolating between the two input samples.

Anti-Aliased Resampling—this approach may be used to ensure that frequency content scales proportionally with the image size, both horizontally and vertically. In essence, the input data is upsampled and low-pass filtered to remove image frequencies created by the interpolation process. A filter removes frequencies that will alias in the resampling process.

Content-Adaptive Scaling—scaling is based in part on the data being scaled (in contrast to a universally-applied scaling algorithm)

Color Correction

Fleshtone correction, white-point correction, and color-saturation enhancement are all examples of different types of color correction algorithms that might be applied, in the alternative or in combination.

Detail Enhancement

Sharpness Enhancement—sharpness is increased through, e.g., examination of the brightness of adjacent pixels and enhancing contrast between them.

Edge Enhancement—detecting angles or edges within an image and amplifying them as a whole.

Super-Resolution—in order to improve the resolution of an image feature, information about the feature is collected over a sequence of frames in which the feature appears. That information may then be used to increase the sharpness of the feature in each of the frames.

It should be appreciated that the foregoing video processing algorithms are merely illustrative, and may differ in alternative embodiments.

The controller 30 is a component of video source device 12 that controls the operation of the video processing functional blocks 22, 24. In particular, the controller is capable of independently activating and deactivating each functional block 22, 24. In cases in which the video processing algorithm applied by a functional block is dynamically configurable, the controller 30 is also capable of dynamically configuring the video processing algorithm to be applied by the functional block. The controller 30 is further capable of receiving commands originating from video sink device 14 for activating or deactivating one or more video processing blocks 22, 24. The controller 30 may be implemented in hardware, software, firmware, or a combination of these, with the implementation of the controller 30 possibly varying based upon the nature of the video source device 12. For example, if the video source device 12 is a PC, then the controller 30 may be a graphics processing unit (GPU) within a graphics subsystem card that executes a video player software application or graphics driver. If the video source device 12 is a piece of consumer electronics equipment, such as a DVD-Video player, the controller 30 (as well as buffer 20 and functional blocks 22, 24) may form part of a hardware video processor component.

Operation of the video source device 12 as described herein may be governed by executable instructions loaded from a machine-readable medium 32, such as a optical disk, magnetic disk or read only memory chip for example, into memory of the video source device 12 (not expressly illustrated) for execution by a processor, which may be controller 30.

Video sink device 14 is an electronic device that receives a video signal comprising video data (e.g. frames or fields) over interconnection 16 and selectively applies further video processing to the video data. In the present embodiment, the video sink device 14 is a display device, such as a CRT, LCD, LCoS, DLP or plasma monitor or television for example, that is also capable of displaying video images based on the received, selectively processed video data. It should be appreciated that some video sink devices, such as intermediate video processors (e.g. DVDO® iScan™ VP50), may not incorporate a display, and that the capacity to display video images is not a required feature of video sink devices. The video sink device 14 of the present embodiment is controlled by a remote control unit 52, which may emit RF signals or infra-red (or near infra-red) beams of light to a receiver (not shown) on the device 14. Other embodiments may be controlled by way of buttons on a front panel of the device.

As illustrated in FIG. 1, the video sink device 14 includes a buffer 40, a display 41, video processing functional blocks 42 and 44, a controller 50, and memory 54. Other components of video source device 12 are omitted for clarity.

Buffer 40 stores video data upon which one or more of the functional blocks 42 and 44 selectively performs video processing functions. The video data may comprise frames or fields for example. The video data in buffer 40 is initially received over interconnection 16 and, in the case where the interconnection 16 conforms to a video interface standard, may be decoded by a video interface receiver (not illustrated), prior to its storage in the buffer. Buffer 40 may form part of a larger volatile memory of the video sink device 14 (such as memory 54, described below), and/or may have the capacity to store multiple contiguous frames or fields at once, in order to facilitate parallel operation of video processing functional blocks 42 and 44. Once video processing functions (if any) have been performed upon the video data by blocks 42 or 44, the video data is displayed on display 41 as video images. A frame buffer (not illustrated) may be interposed between the buffer 40 and the display 41, for storing the video data prior to its display.

The video processing functional blocks 42, 44 are conceptually similar to the video processing functional blocks 22, 24 of video source device 12, although they are not necessarily implemented in the same way. Generally, each block 42, 44 is a hardware, software, or firmware (or a combination of these) block that performs a video processing function. Although only two blocks 42, 44 are illustrated in FIG. 1, it should be appreciated that the number of blocks may be M, where M is an integer greater than one. The number M of blocks in the video sink device 14 can be (but is not necessarily) the same as the number N of blocks in the video source device 12. The video processing functions provided by blocks 42, 44 are at least partly the same as the video processing functions provided by blocks 22, 24 of video source device 12, i.e. the video processing capabilities of devices 12 and 14 overlap. This overlap in video processing capabilities between devices 12 and 14 may be because the devices are modular components that are intended to be capable of interconnection not only with each other but also with various types of other video source device or video sink devices whose video processing capabilities may vary. Some of blocks 42, 44 may be capable of selectively performing one of a number of algorithms to achieve the relevant video processing function.

The controller 50 is a component of video sink device 14 that controls the operation of the video processing functional blocks 42, 44. In particular, the controller is capable of independently activating and deactivating each functional block 42, 44 and, in cases in which the video processing algorithm applied by a functional block is dynamically configurable, of configuring the video processing algorithm to be applied when the block is active. The controller 50 may be implemented in hardware, software, firmware, or combinations of these. In the case where video sink device 14 is a piece of consumer electronics equipment, such as a television, the controller 50 (as well as buffer 40 and functional blocks 42, 44) may form part of a hardware video processor component of the device 14. The controller 50 is also capable of generating and sending commands to video source device 12 for activating or deactivating one or more video processing blocks 22, 24. Operation of the controller 50 is influenced by user input received from remote control device 52 responsive to presentation of a graphical user interface on display 41, as will be described.

Memory 54 is conventional memory used to store a representation of a graphical user interface (GUI) 56, possibly in addition to other data. The GUI 56 is for obtaining user input for use in determining which video processing functions should be performed by the video source device 12 and which video processing functions should be performed by the video sink device 14 in order to achieve the video processing outcome that is preferred by the user. In the present embodiment, the GUI 56 is a wizard that guides the user through a series of screens (or dialog boxes) as described below. The memory 54 may be a read-only memory, with the GUI 56 being loaded therein at the factory, or it may be another form of memory (e.g. flash memory or volatile memory). The GUI 56 may be loaded into memory 54 from a machine-readable medium 58, such as a optical disk, magnetic disk or read only memory chip for example. In some embodiments, the medium 58 may also store executable instructions (software) governing the operation of video sink device 14 as described herein, which may be executed by controller 50 or a separate processor.

The video interconnection 16 is an interconnection for carrying a video signal from the video source device 12 to the video sink device 14 and for carrying other information in the same and opposite directions. In the present embodiment, the video signal is carried on a first channel 60 while the other information is carried on a second channel 62 (referred to as the "command channel"). Other embodiments may lack a second channel 62, and the other information may be carried on the same channel 60 as the video signal. The "other information" includes an indication of the video processing functions provided from video source device 12 to video sink device 14 and one or more commands carried in the opposite direction for causing the device 12 to activate or deactivate one or more video processing functions. Physically, the interconnection 16 may be an electrical or optical cable, or it may simply be air between the devices 12 and 14 over which video data is wirelessly transmitted. The interconnection 16 may be governed by a proprietary signalling protocol. Alternatively, the interconnection 16 may conform to a known video interconnect standard, such as the DVI, HDMI™, DisplayPort®, DFP Interface, OpenLDI, or GVIF standard for example. When the interconnection 16 conforms to the HDMI™ standard, the command channel 62 may be the Consumer Electronics Control (CEC) channel, which is a single-wire, bidirectional, serial bus. In that case, the above-noted commands for causing the device 12 to activate or deactivate one or more video processing functions may be an extension to a set of existing, conventional commands sent over the channel, such as commands from one of the source and sink devices for causing the other of the source and sink devices to power up. If the interconnection 16 conforms to the DVI or HDMI™ standard, the command channel 62 may be the Display Data Channel (DDC). The DDC is governed by a standard promulgated by the Video Electronics Standards Association (VESA) and governs communication between a sink device and a graphics subsystem. The DDC standard (e.g. the Enhanced Display Data Channel (E-DDC™) Standard, Version 1.1, Mar. 24, 2004) provides a standardized approach whereby a video sink device can inform a video source device about its characteristics, such as maximum resolution and color depth, so as to permit the video source device to cause valid display configuration options to be presented to a user for example. When the interconnection 16 conforms to the DisplayPort® standard, the command channel 62 may be the Auxiliary Channel.

Figure 2:
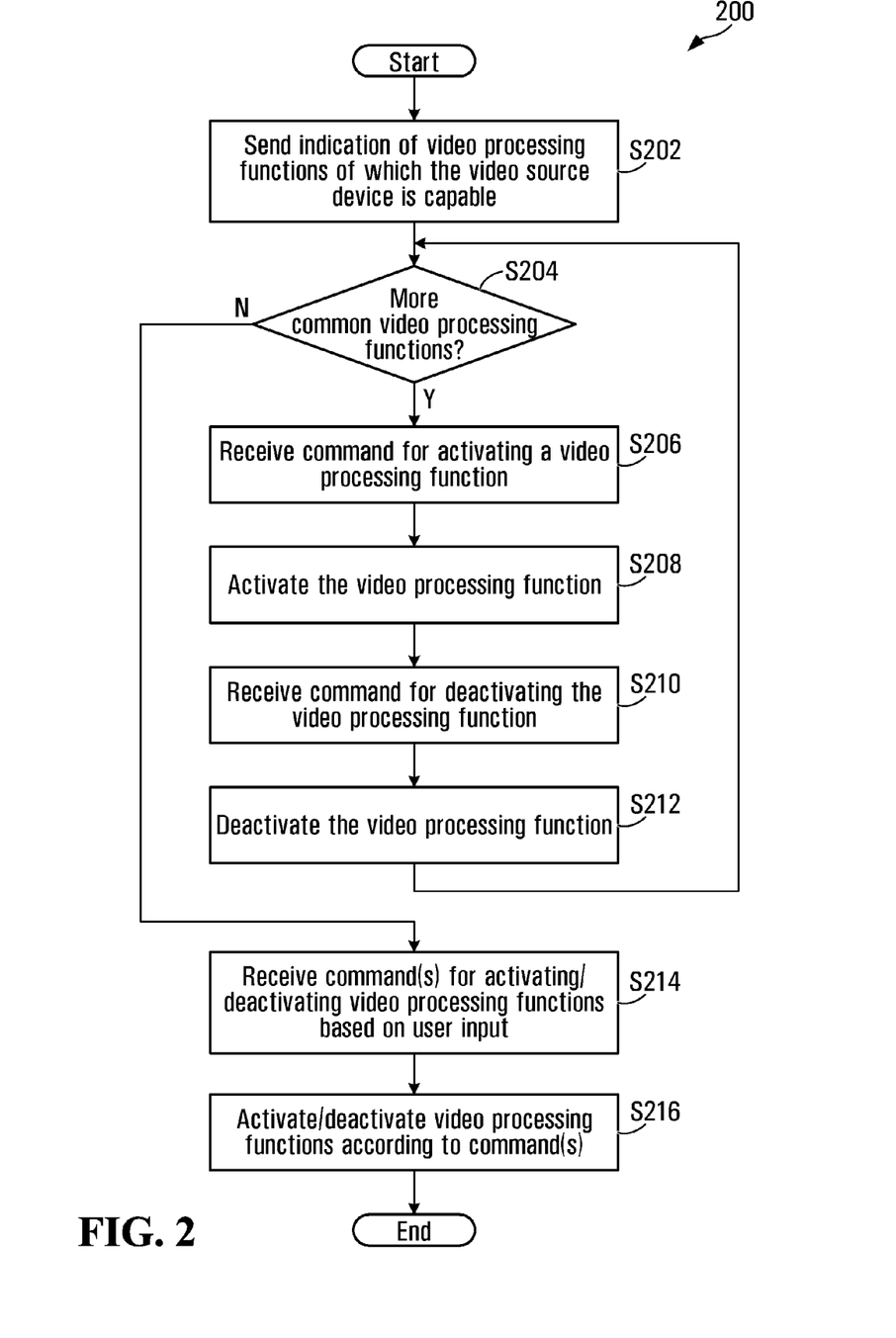
FIG. 2 is a flowchart illustrating operation of the video source device of FIG. 1.
Figure 3:
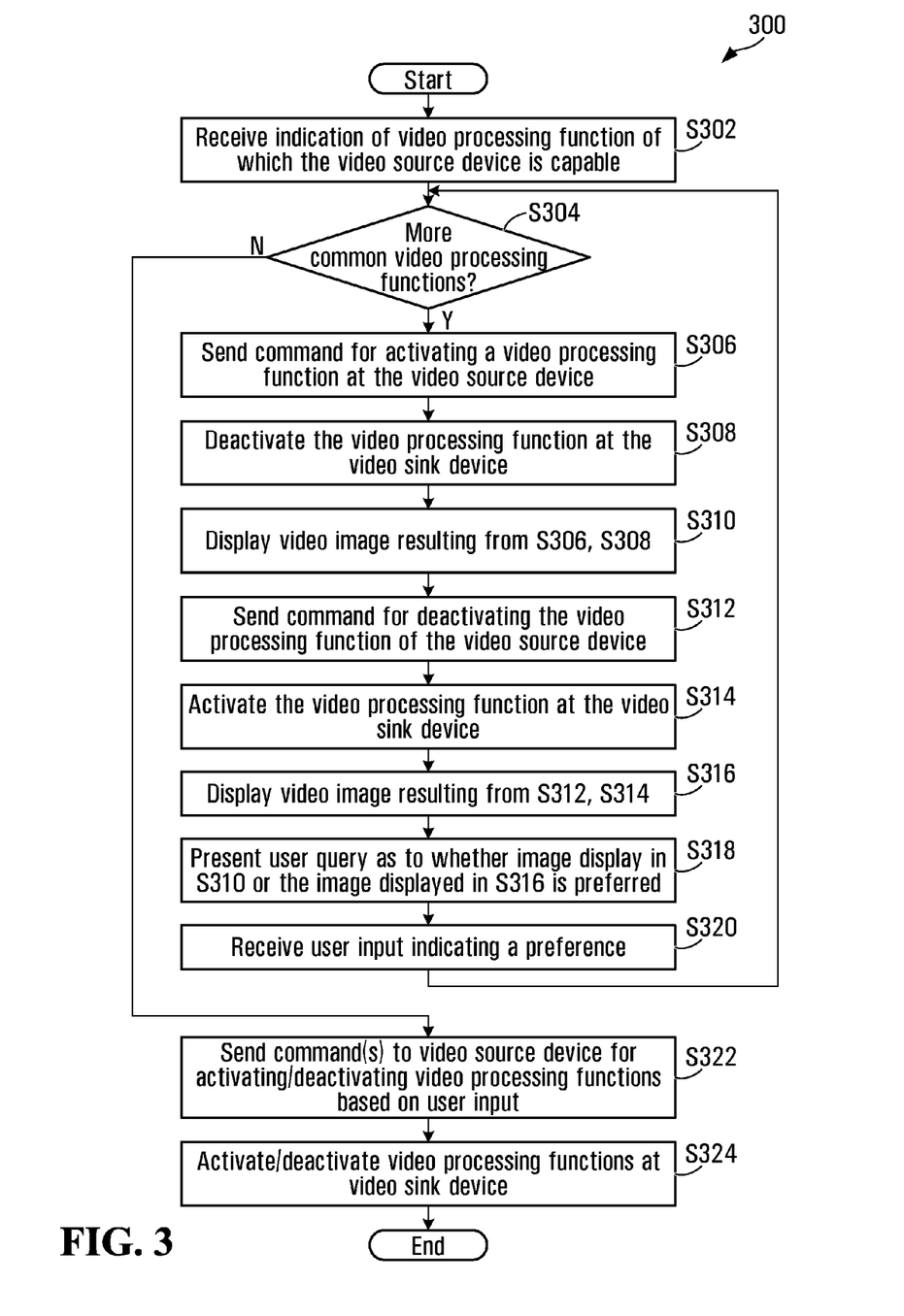
FIG. 3 is a flowchart illustrating operation of the video sink device of FIG. 1.

FIGS. 2 and 3 illustrate operation 200 and 300 of the present embodiment for adjusting video processing in system 10 (FIG. 1). Operation 200 occurs at video source device 12 while operation 300 occurs at the video sink device 14. In the present embodiment, operation 200 and 300 may be triggered by user entry of a command, e.g. using the remote control unit 52 of video sink device 14, indicative of a desire to adjust video processing to the preference of the user.

Figure 4A:
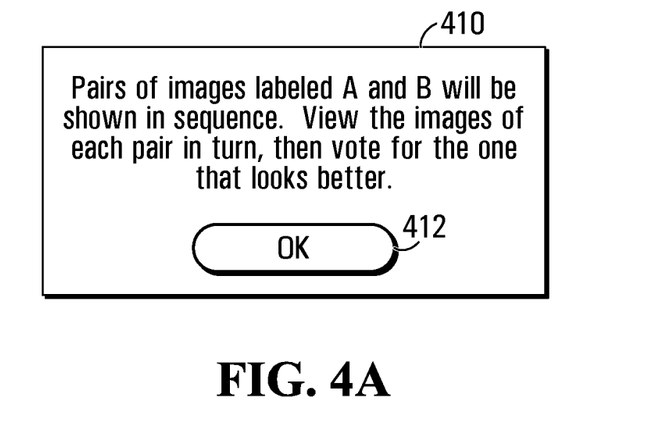
FIGS. 4A to 4D illustrate screens of a graphical user interface presented by the system of FIG. 1.

Responsive to entry of the command, the video sink device 14 may display a first screen 410 of GUI 54, as shown in FIG. 4A. The screen 410 includes text indicating that pairs of images labelled "A" and "B" will be shown in sequence, and that the user should view the images of each pair in turn and vote for the one whose appearance is preferred by the user. User selection of an "OK" button 412 causes the GUI to be advanced to the next screen.

Referring to FIG. 2, the video source device 12 sends an indication of the video processing functions of which it is capable over interconnection 16 (S202) to the video sink device 14, where it is received (S302, FIG. 3). Indication 70 may be communicated over command channel 62, which may be an auxiliary channel defined by a video interconnect standard governing interconnection 16 (if any) that is auxiliary to the first channel 60 over which video data is communicated. For example, the indication could be sent over the DDC channel (of HDMI™ or DVI interconnections), the Auxiliary Channel (of DisplayPort® interconnections) or the Consumer Electronics Control (CEC) channel of HDMI™ connections. In some embodiments, the indication 70 could be sent in-band with video data being communicated over the interconnection 16, e.g. multiplexed within unused portions of the video data such as vertical or horizontal blanking intervals, over first channel 60. The specific approach for achieving such in-band embedding of indication of video processing capabilities 70 may depend upon the operative video interconnect standard governing the interconnection 16 (if any). For example, in embodiments whose interconnection conforms to the HDMI™ standard or the Consumer Electronics Association CEA 861 standard (Rev. D), the indication 70 could be embedded in one or more secondary data packets, referred to as "Info Frames" or "Info Packets", in the main channel of communication. An exemplary indication 70 is illustrated in FIG. 5.

Figure 5:
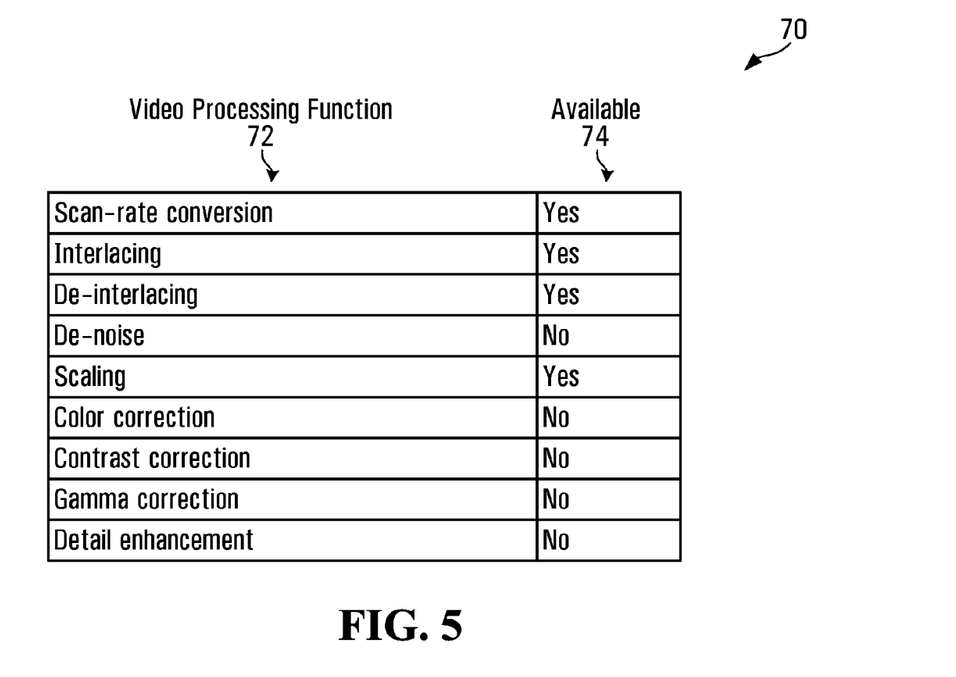
FIGS. 5 and 6 are schematic diagrams illustrating exemplary indications of video processing functions of which the video source device and video sink device (respectively) of FIG. 1 are capable.

Referring to FIG. 5, the indication 70 is represented in the form of a table. It will be appreciated that the actual form of indication 70 within system 10 may be a binary or textual (e.g. markup language) electronic file, record, data structure or message for example. Each of ten different video processing functions of which the video source device 12 may be capable—namely, scan-rate conversion, interlacing, de-interlacing, de-noise, scaling, color correction, contrast correction, gamma correction and detail enhancement—is represented as a row within the table of FIG. 5. The video processing function is identified in column 72 while the capacity of device 12 to perform each video processing function is indicated in column 74. The word "yes" in column 74 indicates that video source device 12 contains a functional block, such as block 22 or 24, for performing the indicated video processing function. Accordingly, based on the values in column 74, it should be apparent that the exemplary video source device 12 to which indication 70 corresponds has four functional blocks, namely, scan-rate conversion, interlacing, de-interlacing and scaling.

Figure 6:
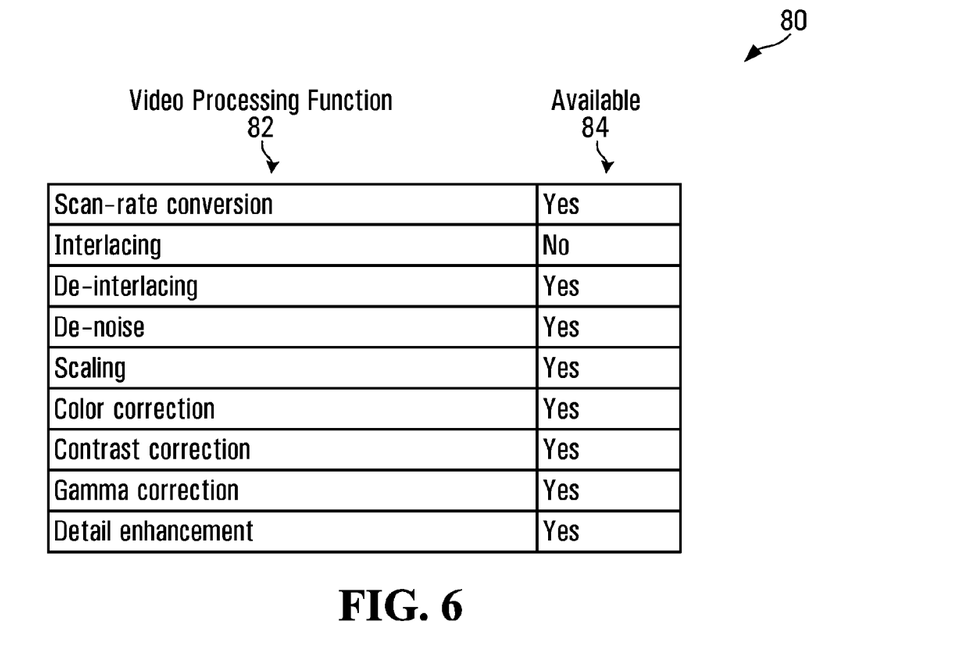

For each video processing function that is common to the video source device 12 and the video sink device 14 (as detailed at S304 of FIG. 3, see also S204, FIG. 2), the video processing function is activated in device 12 and device 14 in turn in order to permit the user to assess whether the video image is preferable when device 12 performs the video processing function or when device 14 performs the function. The video sink device 14 may identify the video processing functions that are common to the devices 12 and 14 by comparing the indication 70 received from video source device 12 to a similar indication 80 of the video processing functions of which the video sink device 14 itself is capable, which may be read by the device 14 from local ROM upon device activation and maintained in memory 54 during operation. Such an indication 80 is illustrated in FIG. 6, in which the same are used as in FIG. 5. Based on the values in column 84 of FIG. 6, therefore, it should be apparent that the exemplary video sink device 14 is capable of performing the nine functions identified in column 82 for which the value in column 84 is "yes" (i.e. all but interlacing). Comparison with the indication 70 reveals that three video processing functions are common to devices 12 and 14: scan-rate conversion, de-interlacing and scaling. For each of these three functions (or a subset of the three), the video sink device 14 performs operation S306 to S320, and the video source device 12 performs complementary operation S206 to S212.

More specifically, the controller 50 of the video sink device 14 (FIG. 1) sends a command to video source device 12 over command channel 62 for activating the first common video processing function at device 12 (S306, FIG. 3). In the event that command channel 62 is the Display Data Channel (e.g. of a DVI or HDMI™ interconnection), the video sink device 14 may need to engage in special processing given that the video source device 12 may conventionally be considered the "master" of the DDC channel. In particular, the sending of the command may initially require the video sink device 14 to simulate a hot plug detect event. As is known in the art, a hot plug detect event is conventionally used to communicate to a video source device (typically a CPU box) that a display device has been dynamically plugged in or unplugged therefrom. By simulating such an event, the video source device 12 can be caused to "retrieve" the command, e.g. as part of an Extended Display Identification Data (EDID) data structure. As is known in the art, the VESA Enhanced Extended Display Identification Data (E-EDID) Standard, Release A, 2.0 (September, 2006), defines a minimum 128-byte data structure (which may be referred to as the "EDID 1.4" data structure) containing information which permits a modern computer to know what kind of monitor is connected to it, including vendor information, maximum image size, color characteristics, factory pre-set timings, frequency range limits, and character strings for the monitor name and serial number. The command could be defined as part of that data structure or within an extension block to that data structure. In alternative embodiments, such hot plug detect event simulation may be unnecessary. For example, when channel 62 comprises the CEC channel, such special processing may not be required because the CEC protocol permits multiple masters to co-exist on a single CEC channel. Thus the video sink device 14 may initiate the communication of the command to device 12 in that case. In some embodiments, the command channel 62 may comprise the CEC channel used in conjunction with the DDC channel for the purpose of communicating commands. For example, a CEC command instructing the video source device 12 to "read a command from the video sink device 14 over the DDC channel" may be sent by the video sink device 14. In the case where the interconnection 16 is governed by the DisplayPort® interface, the video sink device 14 could initiate the communication of the command by sending an interrupt signal to the video source device 12, upon which the device 12 may access the command from device 14 over the DisplayPort® Auxiliary Channel by way of the interrupt vector register. Various mechanisms for communicating the commands between the devices 12 and 14 are possible.

That command is received by device 12 (S206, FIG. 2), where controller 30 responsively activates that video processing function by sending an activation command to the relevant functional block 22 or 24 (S208). The controller 30 may ensure that all functional blocks but the relevant functional block are deactivated so that the video image that results is attributable solely to the video processing function in question. Meanwhile, the controller 50 deactivates the block that performs the same video processing function at video sink device 14 (S308, FIG. 3), and may future deactivate all other functional blocks at device 14. With none of video processing blocks 42, 44 being active, the buffer 40 of the video sink device 14 essentially acts as a pass-through for the video data. This is so that that the effects of the sole, active functional block of device 12 upon the video image are not corrupted by local video processing at device 14 that might detract from the user's capacity to assess the effects of the processing by device 12 upon the video image.

Figure 4B:
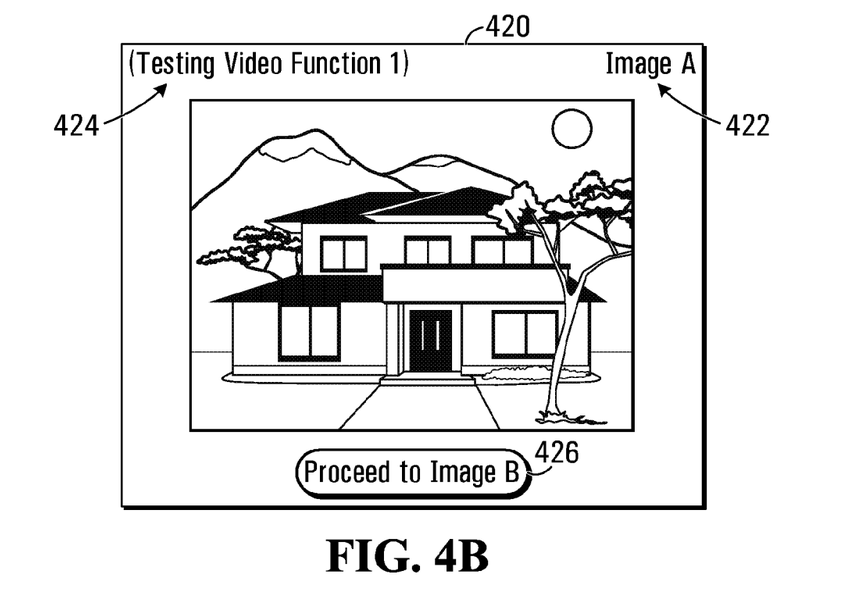

The resulting video image, which is based on video data processed only by the active functional block of device 12, is then displayed on display 41 (S310), as shown in FIG. 4B. The image is presented within a GUI screen 420 of GUI 56 which includes an identification 422 of the image ("image A") and a parenthesized indicator 424 of the video processing function currently being tested. The latter indicator 424 may be omitted if it is not considered important for the user to appreciate the nature of the video processing function currently being tested. A GUI control 426 (e.g. a button) permits the user to control how long the image is displayed, so that the user may study the image as long as desired.

Upon selection of control 426, the controller 50 (FIG. 1) sends a command over command channel 62 for deactivating the video processing function at device 12 (S312, FIG. 3). That command is received by device 12 (S210, FIG. 2), where controller 30 responsively deactivates that video processing function by sending a deactivation command to the relevant functional block 22 or 24 (S212). With none of video processing blocks 22, 24 being active at device 12 (FIG. 1), the buffer 20 now essentially acts as a pass-through for the video data. Thereafter, the controller 50 of device 14 activates the block that performs the same video processing function at video sink device 14 (S314, FIG. 3). For clarity, the present example assumes that the video processing algorithm applied by the functional block of device 14 differs from that of device 12.

Figure 4C:
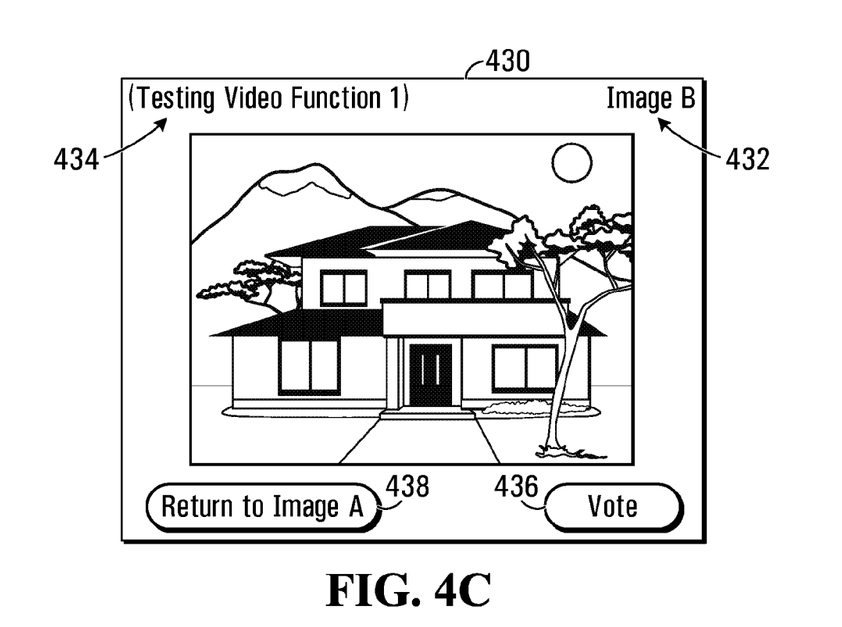

The new video image, which is based on video data processed only by the sole active functional block of device 14, is then displayed on display 41 (S316), as shown in FIG. 4C. The image is presented within a GUI screen 430 of GUI 56 which includes an identification 432 of the image ("image B") and a parenthesized indicator 434 of the video processing function currently being tested (the latter similarly being optional). A GUI control 436 labelled "vote" permits the user to control how long image B is displayed before the user votes for the preferred one of images A and B. This permits the user to study the second image as long as desired. Another GUI control 438 alternatively permits the user to revert to image A for the sake of comparison. In this case the operation S306, S308, S310 of FIG. 3 and S206, S208 of FIG. 2 would be repeated, with the redisplayed GUI screen 420 of FIG. 4B possibly being updated to include a "vote" control similar to GUI control 436 of FIG. 4C (since both images A and B are now known to have been displayed). If desired, the user can toggle between images A and B using controls 426 and 438 when considering which image is preferred. It is possible that, for embodiments in which the video processing algorithm within the functional block at device 12 or device 14 can be dynamically configured to be one of a number of video processing algorithms, the "best" video processing algorithm is automatically chosen when the block is activated at that device.

Figure 4D:
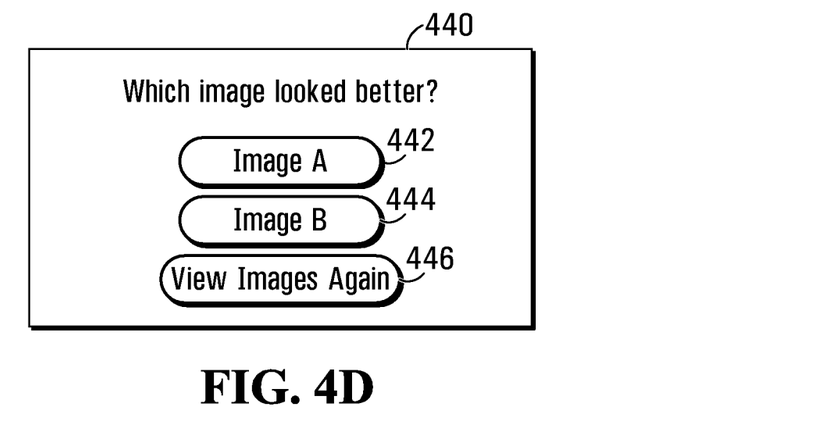

Upon user selection of GUI control 436 (FIG. 4C) or its counterpart on the redisplayed GUI screen 420 (if redisplayed), a further GUI screen 440, as shown in FIG. 4D, is displayed (S318, FIG. 3). The screen 440 invites the user to choose image A or image B as the preferred image by selecting GUI control 442 or 444 respectively. A GUI control 446 permits the images to be viewed again if desired, e.g. by reverting to GUI screen 420 of FIG. 4B. User input indicating a preference for image A or image B (i.e. indicating a preference for the functional block at device 12 or device 14) is thereafter received (S320, FIG. 3) and stored.

If it is determined that more common video processing functions exist (S304), then operation S306 to S320 (FIG. 3) and S206 to S212 (FIG. 2) is repeated for each function. Each video processing function may be performed upon the same source video content. The video content may simply be content that the user intends to watch (e.g. a movie or video game), in which case the system 10 may advantageously be "tuned" specifically to the video content of interest at that time. Alternatively, each video processing function may be performed upon different video content, with the content possibly being function-specific with a view towards maximizing the ability of the user to select the preferred video processing algorithm as between devices 12 and 14. For example, when testing motion-adaptive noise reduction, the content may be moving images; when testing sharpness enhancement, the content may be a blurry image; and so forth. To the extent that parenthesized indicators 424 and 434 of FIGS. 4B and 4C are being displayed, they should be updated to reflect the video processing function currently being tested.

Ultimately, user input indicating a preference for the relevant functional block at either device 12 or device 14 will be received for each common video processing function. At this stage, controller 50 effects the preferences of the user by sending one or more commands to device 12 to cause it to activate and/or deactivate its video processing blocks (S322) and by activating and/or deactivating the same video processing functional blocks of the video sink device 14 in a complementary fashion (i.e. if the block at device 12 is activated, the corresponding block at device 14 is deactivated, and vice-versa), in accordance with the preferences of the user (S324). At the device 12, the command(s) are received (S214) and effected (S216). Operation 200 and 300 is thus concluded.

Advantageously, all that is required of the user in order for the devices 12 and 14 to be configured according to the preferences of the user is to answer the questions presented on the screens of GUI 56. The user is not required to manually configure either of devices 12 or 14 to achieve the desired result, nor even to know what video processing functions have been configured in order to achieve the desired result.

It is noted that the earlier-described operation at S202, S302 need not be responsive to the entry of a user command for adjusting video processing. Operation S202, S302 could instead be performed during initialization of the video source device 12, e.g. upon detection of the sink device 14 (and possibly only during that stage, e.g. if indication 70 is unlikely to change during the period of interconnection of the devices 12 and 14).

It should be appreciated that the activation/deactivation of a video processing function at device 12 or 14 may bear upon whether another video processing function may or may not be activated, or indeed must simultaneously be activated, at that device. For example, if a form of de-interlacing is activated that necessarily involves scaling, then it may be necessary to activate the scaling function simultaneously with the de-interlacing function. In another example, edge enhancement performed by the source might affect the contrast correction also performed by the source. In such cases, it may be necessary to modify the operation S206 to S212 and S306 to S320 of FIGS. 2 and 3 respectively to cause multiple functional blocks corresponding to these functions to be simultaneously activated, first at device 12, then at device 14, rather than only one block at a time at each device as described above.

Generally, it should also be appreciated that activation/deactivation of video processing functional blocks within system 10 may be influenced by factors other than operation 200 and 300. For example, a user of video source device 12 or video sink device 14 may be able to override any activation/deactivation of video processing resulting from operation 200 and 300. Thus, while operation 200 and 300 can assist in automatically selecting video processing algorithms to be performed within the system 10, it is not necessarily wholly determinative of the video processing functions that shall ultimately be performed there.

As will be appreciated by those skilled in the art, modifications to the above-described embodiment can be made without departing from the essence of the invention. For example, in the above embodiment, the video source device sends an indication of the video processing functions of which it is capable (S202, FIG. 2), which is received by the video sink device. Then, the steps described at S204 to S212 and S304 to S320 are performed for each indicated video processing function that is common to the devices. In some embodiments, the video sink device may not know the video processing functions of which the video source device is capable. Rather, the steps described at S204 to S212 and S304 to S320 may be performed "blindly" for one or more video processing functions of which the device driving the procedure, i.e. the video sink device, is capable, in the expectation that the other device, i.e. the video source device, may be capable of effecting at least one of those video processing functions. Thus, the steps may not be limited to only video processing functions that are common to the two devices. Similarly, some embodiments may recognize the fact that a user may prefer certain video processing functions to be deactivated, regardless of whether the function is common to the two devices or only provided by one of the devices. Thus, one image A may represent a video processing function having been activated, while another image B may represent that function having been deactivated. The user can then select the image in which the non-preferred video processing function is deactivated, which will have the effect of deactivating that video processing function at the device(s) providing that function. Also, it will be appreciated that in some embodiments, the steps described at S204 to S212 and S304 to S320 may be performed for only a subset (e.g. at least one) indicated video processing function that is common to the devices.

The user interface illustrated in FIGS. 4A-4D may differ in alternative embodiments. For example, instead of having a separate screen as shown in FIG. 4D, the screens shown in FIGS. 4B and 4C could each have user interface controls for voting for either of image A or B. In some embodiments, there may be no need for two separate screens as in FIGS. 4B and 4C if images A and B can be displayed simultaneously, e.g. side-by-side, in a single screen. Such simultaneous display may entail activation of scaling and blending operations. In some cases (e.g. for NTSC signals), it may be possible to display both images simultaneously without any scaling, although blending may still be necessary. For example, in one embodiment a command may be sent to the source, telling it to activate a split-screen, where the source may only apply its processing on one-half of the screen, so that the sink device can apply its processing to the other half of the screen. In another embodiment, the sink device may receive an image that has) been processed by the source device from the source device and store the processed video in a buffer. The sink device may then request unprocessed video from the source device so that it may apply its own video processing thereto, with the two ultimately being displayed side-by-side.

It is not necessary for two separate user interface controls (e.g. GUI controls 442, 444 of FIG. 4D) to be used to specify a preference for image A or B. In some embodiments, a single user interface control, such as a pull-down or drop-down list, may be sufficient for specifying the preference.

In some embodiments, the video sink device 14 may lack a display (e.g. it may be an intermediate video processor). In such cases, the video sink device 14 may output a video signal to a display device upon which video images are displayed to permit the user to observe the effects of video processing as performed by devices 12 and 14 in turn. In such cases, it may be necessary to deactivate video processing functions at the display device, so that that the effects of currently active functional block of device 12 or 14 upon the video image are not corrupted by local video processing at the display device that might detract from the user's capacity to assess the video image. To the extent that the video processing functions at the display device can be automatically deactivated, e.g. by sending commands over a command channel of an interconnection between video sink device 14 and the display device (in a similar fashion to that described above), this would shield the user from having to configure the display device manually. Moreover, if the user input indicative of a preference for image A or image B is thereafter received from a remote control unit or front panel of the display device, it may be necessary to communicate this user input from the display device to video sink device 14 over the command channel.

In another alternative, the role of the devices 12 and 14 in terms of the operation described in FIGS. 2 and 3 could be reversed. That is, the video source device 12 may perform operation 300 of FIG. 3 while video sink device 14 performs operation 200 of FIG. 2, with each reference to "video source device" in FIGS. 2 and 3 being replaced with "video sink device", and vice-versa. Accordingly, the device 14 would communicate an indication of the video processing function of which it is capable to the device 12 (rather than the reverse), while commands to activate/deactivate video processing functions would be sent in the opposite direction. The above-noted considerations relevant to using the CEC, DDC or Auxiliary Channels for carrying the indication of video processing functions and/or commands between devices 12 and 14 in the above-described embodiment may essentially be reversed for the present embodiment. As well, operation S310 and S316 for displaying the video images would consist of outputting a video signal to the video sink device 14, which would display the images (rather than video source device 12).

In such an alternative embodiment, or in the originally described embodiment, the video sink device 14 may be a display device that conforms to a monitor instruction standard, such as the Monitor Control Command Set (MCCS) standard defined by the Video Electronics Standards Association (VESA). As is known in the art, the MCCS standard defines a set of instructions that permits the operation of a monitor to be controlled remotely over a command channel from a video source device. The types of operations that can be typically be controlled using MCCS include setting luminance, contrast, picture size, position, and color balance, or other settings that may conventionally be set using an on-screen display control mechanism. In some embodiments, this set of instructions may be extended under the MCCS standard to include the commands referenced in FIGS. 2 and 3 for activating/deactivating video processing functions at the "other" device (where the "other" device in this case is the video sink device 14, not the video source device 12). For example, the video source device 12 may send commands that effectively cause the video sink device 14 to "sweep" each relevant video processing function that is dynamically configurable through each of its possible levels or settings (i.e. may cause different video processing algorithms to be applied for each video processing function), after which the user may select the level or setting that is preferred.

It will further be appreciated that, in some embodiments, either or both of the video source device and video sink device may comprise a circuit. The circuit may for example be a standalone integrated circuit, or may form part of a larger integrated circuit, or may be subsumed within an electronic device. The circuit may be fabricated using fabrication equipment, such as the type of equipment found in a semiconductor fabrication plant or foundry for example. The equipment may generate circuits based on a set of instructions comprising hardware description language that describes the circuit. The fabrication equipment processes the instructions and, based on that processing, creates the circuit. This approach may be used to fabricate a circuit representative of a video source device or a circuit representative of a video sink device (or both).

Figure 7:
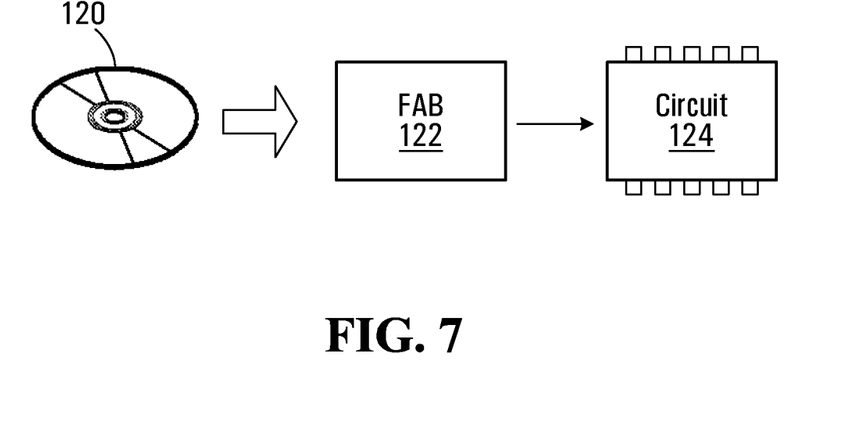
FIG. 7 is a simplified schematic diagram of the fabrication of a circuit comprising a video source device or video sink device.

This approach is schematically illustrated in FIG. 7. Exemplary hardware description language instructions stored on a machine-readable medium 120 are processed by exemplary fabrication equipment 122, which creates an exemplary circuit 124 based on the processed instructions. The exemplary instructions may for example be in a hardware description language, such as HDL, Very High Speed Integrated Circuit Hardware Description Language (VHDL), Altera HDL (AHDL), Verilog or Verilog-A.

Other modifications will be apparent to those skilled in the art and, therefore, the invention is defined in the claims.

What is claimed is:

1. A method comprising, at one of a video source device and a video sink device:
 (a) deactivating a video processing function at the one device and sending a command for causing the other of said video source device and said video sink device to activate the video processing function;
 (b) activating the video processing function at the one device and sending a command for causing the other device to deactivate the video processing function; and
 (c) based on user input indicating whether (a) or (b) resulted in a preferred video image, effecting (a) or (b).

2. The method of claim 1 further comprising, at said one device:
 receiving an indication of video processing functions of which the other device is capable; and
 performing (a), (b) and (c) for at least one indicated video processing function of which the one device is also capable.

3. The method of claim 1 wherein said video sink device comprises a display and further comprising displaying on said display a user interface including at least one selectable control for indicating whether a video image resulting from (a) is preferred or a video image resulting from (b) is preferred, wherein said user input comprises user manipulation of said at least one selectable control.

4. The method of claim 3 wherein said at least one selectable control comprises a first selectable control for indicating that the video image resulting from (a) is preferred and a second selectable control for indicating that the video image resulting from (b) is preferred, and wherein said user manipulation comprises user selection of one of said first control and said second control.

5. The method of claim 1 further comprising alternating between (a) and (b) upon user request before performing (c).

6. The method of claim 1 wherein said sending a command is over an auxiliary channel in an interconnection between said video source device and said video sink device, said channel being auxiliary to a primary channel of said interconnection for carrying a video signal from said video source device to said video sink device.

7. The method of claim 6 wherein said interconnection is an High-Definition Multimedia Interface (HDMI) interconnection and wherein said auxiliary channel is a Consumer Electronics Command channel or a Display Data Channel.

8. The method of claim 6 wherein said interconnection is DisplayPort interconnection and wherein said auxiliary channel is an Auxiliary Channel.

9. The method of claim 1 wherein the one device is said video sink device and the other device is said video source device.

10. The method of claim 1 wherein the one device is said video source device and the other device is said video sink device.

11. The method of claim 10 wherein said video sink device comprises a display operable to receive and implement commands defined according to the Monitor Control Command Set (MCCS) standard and wherein each of said command for causing the other device to activate the video processing function and said command for causing the other device to deactivate the video processing function comprises one of the commands defined according to the MCCS standard or an extension to the commands defined according to the MCCS standard.

12. A non-transitory machine-readable medium storing instructions that, when executed by a processor of one of a video source device and a video sink device, cause said one device to:
  (a) deactivate a video processing function at the one device and send a command for causing the other of said video source device and said video sink device to activate the video processing function;
  (b) activate the video processing function at the one device and send a command for causing the other device to deactivate the video processing function; and
  (c) based on user input indicating whether (a) or (b) resulted in a preferred video image, effect (a) or (b).

13. The machine-readable medium of claim 12 wherein said instructions further cause said one device to:
  receive an indication of video processing functions of which the other device is capable; and
  perform (a), (b) and (c) for at least one indicated video processing function of which the one device is also capable.

14. The machine-readable medium of claim 12 wherein said video sink device comprises a display and wherein said instructions further cause a user interface to be displayed on said display, said user interface including at least one selectable control for indicating whether a video image resulting from (a) is preferred or a video image resulting from (b) is preferred, wherein said user input comprises user manipulation of said at least one selectable control.

15. The machine-readable medium of claim 12 wherein the one device is said video sink device and the other device is said video source device.

16. The machine-readable medium of claim 12 wherein the one device is said video source device and the other device is said video sink device.

17. A video sink device comprising a processor and memory interconnected with said processor, said memory storing instructions which, when executed by said processor, cause said video sink device to:
  (a) deactivate a video processing function at the video sink device and send a command for causing a video source device to activate the video processing function;
  (b) activate the video processing function at the video sink device and send a command for causing the video source device to deactivate the video processing function; and
  (c) based on user input indicating whether (a) or (b) resulted in a preferred video image, effect (a) or (b).

18. The video sink device of claim 17 wherein said instructions further cause said video sink device to:
  receive an indication of video processing functions of which the video source device is capable; and
  perform (a), (b) and (c) for at least one indicated video processing function of which the video sink device is also capable.

19. The video sink device of claim 17 further comprising a display, wherein said instructions further cause said video sink device to display on said display a user interface including at least one selectable control for indicating whether a video image resulting from (a) is preferred or a video image resulting from (b) is preferred, wherein said user input comprises user manipulation of said at least one selectable control.

20. A video source device comprising a processor and memory interconnected with said processor, said memory storing instructions which, when executed by said processor, cause said video source device to:
  (a) deactivate a video processing function at the video source device and send a command for causing a video sink device to activate the video processing function;
  (b) activate the video processing function at the video source device and send a command for causing the video sink device to deactivate the video processing function; and
  (c) based on user input indicating whether (a) or (b) resulted in a preferred video image, effect (a) or (b).

21. The video source device of claim 20 wherein said instructions further cause said video source device to:
  receive an indication of video processing functions of which the video sink device is capable; and
  perform (a), (b) and (c) for at least one indicated video processing function of which the video source device is also capable.

22. A non-transitory machine-readable medium storing instructions that, when processed, cause the creation of a circuit capable of:
  (a) deactivating a video processing function at one of a video source device and a video sink device and sending a command for causing the other of said video source device and said video sink device to activate the video processing function;
  (b) activating the video processing function at the one device and sending a command for causing the other device to deactivate the video processing function; and
  (c) based on user input indicating whether (a) or (b) resulted in a preferred video image, effecting (a) or (b),
  wherein said circuit comprises said one device.

23. The machine-readable medium of claim 22 wherein said one device is the video source device and said other device is the video sink device.

24. The machine-readable medium of claim 22 wherein said one device is the video sink device and said other device is the video source device.

25. The machine-readable medium of claim 22 wherein said instructions comprise hardware description language instructions.

26. The machine-readable medium of claim 25 wherein said hardware description language is one of Verilog hardware description language, Verilog-A hardware description language, Altera Hardware Description Language (Altera HDL), and Very High Speed Integrated Circuit Hardware Description Language (VHDL).

* * * * *